Oct. 31, 1933.  S. R. MERLEY  1,933,505
PROCESS OF PURIFYING ALCOHOLS
Filed July 9, 1931
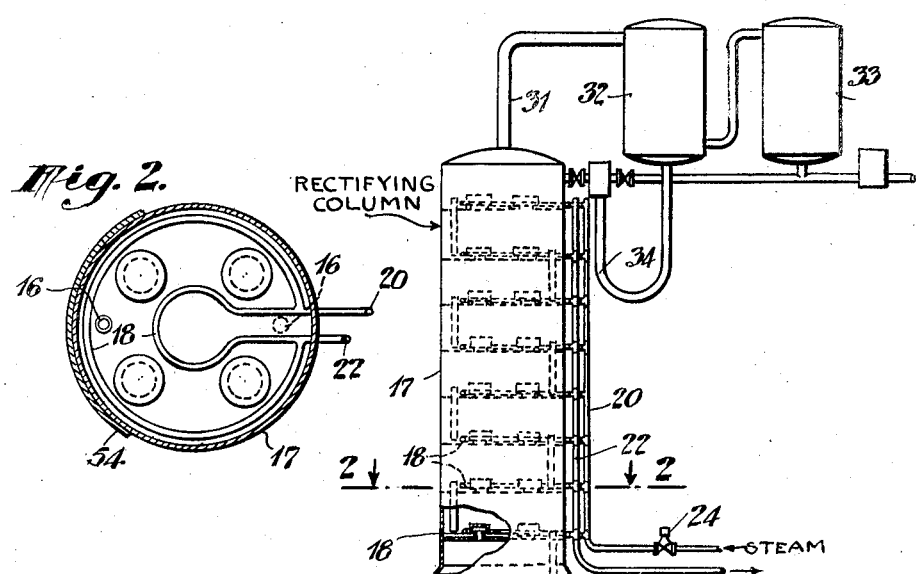
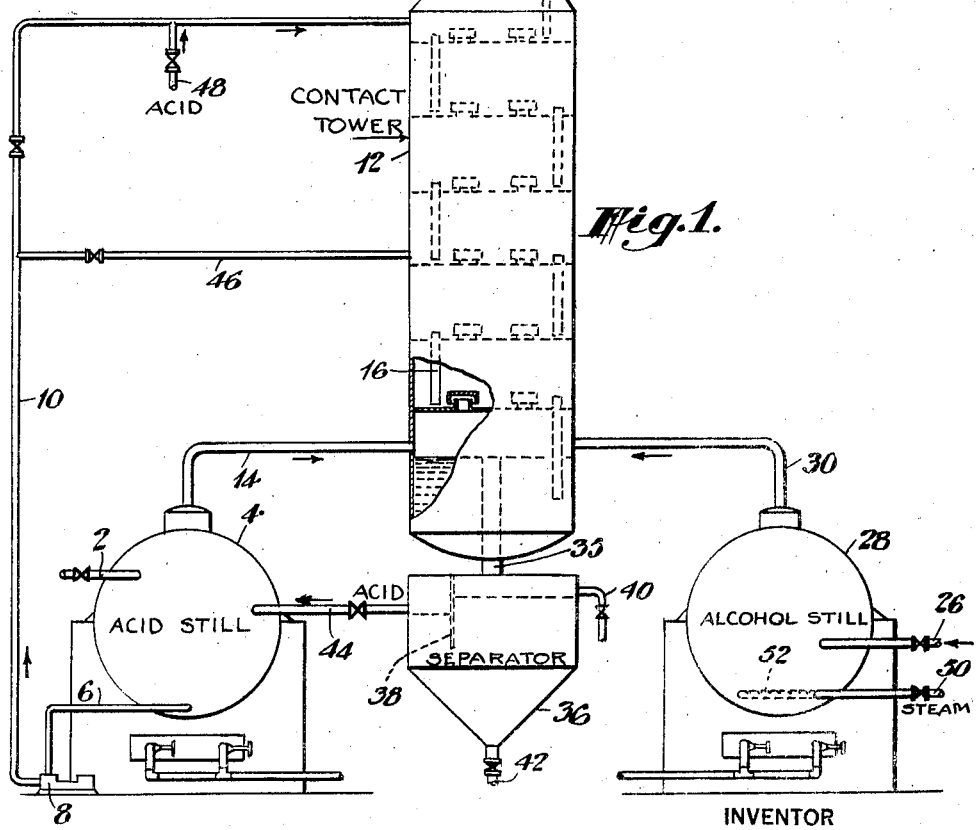
INVENTOR
SYLVAN R. MERLEY
BY
ATTORNEY Patented Oct. 31, 1933

1,933,505

UNITED STATES PATENT OFFICE 1,933,505

PROCESS OF PURIFYING ALCOHOLS

Sylvan R. Merley, Dover, N. J., assignor to Doherty Research Company, New York, N. Y., a corporation of Delaware Application July 9, 1931. Serial No. 549,616

11 Claims. (Cl. 202—57)

The present invention relates to the purification of alcohols and more particularly to the removal of certain classes of impurities from secondary alcohols.

In the production of alcohols from petroleum distillates or gases containing olefins, by the absorption of the olefins in sulfuric acid with subsequent hydrolysis, the resulting crude alcohol product as distilled over contains sulfur compounds and polymers, as well as small amounts of tertiary alcohols which contaminate the refined product.

When the various alcohol cuts are made from the crude mixed product, the individual alcohol cuts as made, and later rectified and purified by known methods, still contain the mentioned impurities since they boil at the same temperature as the alcohol and are not removed by washing. For example semi-refined isopropyl alcohol as made from cracked petroleum gases contains hydrocarbon polymers, sulfur bodies and small amounts of tertiary butyl alcohol.

The alcohols produced by the oxidation of hydrocarbon gases or liquids also contain impurities of the kinds referred to above, and may also be treated and purified by the process of the present invention.

An important object of the invention is the production of secondary alcohols entirely free from tertiary alcohol.

A further object is the production of alcohols free from sulfur bodies and polymers.

In accordance with these objects the invention comprises a process which includes the treatment of the alcohol to be refined, with heated dilute sulfuric acid.

Other and further objects and advantages will be apparent from the following detailed description taken in connection with certain specific examples:

Semi-refined isopropyl alcohol obtained as a constant boiling mixture with water, contains small amounts of tertiary butyl alcohol, sulfur bodies and other polymer impurities. Isopropyl alcohol with water boils at about 80.4° C. while tertiary butyl alcohol boils from about 81 to 82° C. under the same conditions. In accordance with the invention vapors of this semi-refined isopropyl alcohol are passed into contact with dilute sulfuric acid of about 25% $H_2SO_4$, maintained at a temperature above the boiling point of the alcohol mixture, preferably about 95 to 97° C. This operation is preferably carried out in a tower in which the hot acid flows counter to and in contact with the alcohol vapors. A tower of the bubble tray type or of the filled type may be used, and a temperature control coil may be employed to control the temperature therein.

In passing upwardly through the acid in the contact tower the alcohol vapor is washed free of the impurities, which are removed with the acid at the base of the tower. The removal of the impurities is largely due to their increased solubility in the acid over that in the alcohol, particularly the alcohol vapor.

While the tertiary alcohol is more soluble in the acid liquor than in the isopropyl alcohol, a part of the tertiary butyl alcohol is changed by the dehydrating action of the sulfuric acid to isobutylene which is taken off as a gas and allowed to escape to a sulfuric acid absorber when the isopropyl alcohol is condensed. Other portions of the tertiary butyl alcohol may be polymerized to diisobutylene and remove with the acid liquor.

An apparatus adapted to carry out the process of the invention is shown in the accompanying drawing in which:

Fig. 1 is a diagrammatic vertical view of an apparatus adapted to carry out the process.

Fig. 2 is a horizontal section of the column shown in Fig. 1 looking down on any plate of the column.

Referring to the drawing, dilute sulfuric acid for the process is introduced by pipe 2 into a still 4 in which the acid is heated to the proper temperature, which in the case of isopropyl alcohol treatment would be from 95° to 97° C. The heated acid from still 4 is withdrawn through a pipe 6 and passed by a pump 8 through a pipe 10, into the upper portion of a bubble plate contact tower 12. The still 4 is provided with a vapor line 14 which discharges into the base of the tower 12. When the dilute 25% sulfuric acid is heated above the temperature referred to, water vapor will begin to distill off through the vapor line 14.

The tower 12 is of the usual bubble tray construction as shown in the drawing in which overflow pipes 16 are used to conduct the dilute sulfuric acid downwardly through the tower. Superimposed above and connecting with contact tower 12 is a rectifying column 17 of the bubble plate type in which overflow pipes 16 are also provided for conducting reflux water downwardly through the rectifying column into the contact tower. The column 17 is also provided with steam heating coils 18 connected with a steam inlet line 20 and a condensate discharge line 22. The steam line 20 is provided with a pressure-regulating valve 24 so that the proper steam pressure may be provided for maintaining the desired temperature in column 17.

The alcohol-water mixture to be treated in the tower 12 is introduced into the system through a valved pipe 26 which discharges into a still 28, in which the alcohol is vaporized. Vapors from still 28 pass through a vapor line 30 into tower 12 below the lowermost bubble tray, and then upwardly through the column bubbling through the dilute sulfuric acid on the trays. The purified alcohol vapors carrying excess water picked up from the acid in tower 12 are conducted upwardly through rectifying column 17 to remove water, and are thence conducted through a vapor line 31 into a dephlegmator 32 and thence through an alcohol vapor condenser 33. Reflux condensate may be returned to the top tray of the rectifying column from the dephlegmator 32 through a valved reflux return pipe 34.

The sulfuric acid in passing downwardly through the tower 12 scrubs the impurities from the alcohol vapor passing therethrough and finally collects in a pool in the base of the tower. This material, which is a mixture of dilute sulfuric acid and polymers, is conducted through an overflow pipe 35 into a separator 36 provided with a depending partition wall 38 around the lower edge of which the separated sulfuric acid flows. The separated polymers which form a layer on the sulfuric acid are withdrawn through a valved pipe 40, while any heavy sludge may be discharged through a valved pipe 42. The relatively clean sulfuric acid is conducted from the separator 36 by a valved pipe 44 and reintroduced into the still 4 where it may be brought to the desired concentration and temperature for recirculation in the system.

After the sulfuric acid in the treating system has been used for some length of time it may become somewhat contaminated with soluble polymers and other materials, in which case the recirculated acid may be conducted into the mid-portion of the tower 12 through a valved pipe 46, so that the used sulfuric acid cycle will include only the lower half of the tower in which most of the more disagreeable impurities are removed from the alcohol vapor. During this operation the valve in pipe 10 is closed and fresh dilute sulfuric acid is introduced into the upper portion of the tower 12 by the valved pipe 48. This fresh acid may comprise the make-up acid introduced into the system during the operation, and in case this make-up acid is insufficient for treating purposes in the upper portion of the tower, the valve in pipe 10 may be partially open to permit the passage of a small amount of the recirculated acid along with the fresh acid.

In treating relatively high boiling alcohols, steam may be introduced into the still 28 by means of steam line 50 and perforated distributor 52.

In operation the treating temperature is maintained substantially constant and uniform throughout the contact tower 12 and the rectifying column 17. The treating temperature for purifying any constant boiling mixture of alcohol and water should be maintained within a definite relatively narrow range determined by the boiling point of the constant boiling mixture under treatment and by the concentration of the acid wash. By thus employing uniform temperatures in acid washing and rectifying, substantial equilibrium is maintained between the acid, water and impurity components of the acid wash, because the refluxing action in column 17 on the vapors leaving tower 12 serves to maintain a substantially true constant boiling mixture proportion of alcohol and water in the vapors taken off from the top of the rectifying column, and to continually return a substantially uniform volume of water to the top of the contact tower 12. A uniform scrubbing or washing action is thus insured in tower 12. In treating a semi-refined constant boiling mixture of isopropyl alcohol and water to remove therefrom small amounts of tertiary butyl and other impurities, for example, it has been found that a wash acid of 25% sulfuric concentration can be advantageously utilized and maintained in substantial equilibrium by employing a treating temperature of approximately 93–97° C. in the contact tower and rectifying column. For treating secondary alcohols higher than isopropyl the optimum concentration of the wash acid is preferably below 25%, because the tendency of alcohols to decompose in the presence of a given strength of sulfuric acid increases with an increase in molecular weight. Depending on the molecular weight of the alcohol treated, the concentration of the wash acid is normally from 1.1 to 1.25 sp. gr., and the stronger the wash acid the more nearly the treating temperature should be maintained to the boiling point of the constant boiling alcohol-water mixture treated.

The apparatus as described is preferably completely insulated as shown at 54 in order to retain the heat in the system and at the same time aid in the proper control of temperature and concentration of the acid. Lead or copper lining is also preferably used for the parts of the apparatus which come in contact with sulfuric acid.

The process has been described somewhat in detail with respect to the treatment of isopropyl alcohol purification, but the same procedure is equally applicable to the higher secondary alcohols. It is to be understood that a definite acid concentration may be necessary in order to obtain the best results with a particular alcohol. It is also preferred in each case to heat the acid to a temperature above the temperature required to distill the alcohol in the presence of water.

In treating the lower boiling secondary alcohols, it is preferred to treat the vapors containing not substantially more water than that in its constant boiling mixture, if any. With the higher boiling alcohols, however, larger amounts of water or steam are necessary to keep the temperature down and thereby aid in maintaining the concentration of the acid washing agent at the desired percentage.

In selecting the acid concentration to be used in any case, based on the greater solubility of tertiary alcohols and sulfur bodies than secondary alcohols in the acid, the relative stablity of the secondary alcohol must be taken into account. Likewise the temperature at which the treatment is carried out should be correlated with acid concentration and the alcohol stability, so that a minimum alcohol loss is entailed. In some cases it may be necessary to maintain the contact temperature below the vaporizing point of the alcohol, particularly with higher alcohols.

In treating secondary alcohols in accordance with this invention it will be found that the removal of some polymers and impurities from the alcohol will cause a change in the boiling point in other impurities such as organic disulfides, so that in a subsequent distillation of the alcohol they will be readily separated.

Having thus described the preferred form of the invention, what is claimed as new is:

1. The process of refining isopropyl alcohol produced from olefines by absorption in sulfuric acid, with subsequent hydrolysis and distillation therefrom, which comprises passing the isopropyl alcohol to be refined in the vapor phase countercurrent and in contact with a sulfuric acid solution containing about 25% sulfuric acid, removing and condensing the alcohol vapors subsequent to said contacting, separating the absorbed impurities from the sulfuric acid and restoring the acid solution to about 25% sulfuric acid, reheating the relatively clean acid and introducing it into the contact zone.

2. The process of refining secondary alcohol in the vapor state, which comprises passing the vapors in contact with hot dilute sulfuric acid in a contact zone, passing the purified vapors free of sulphuric acid through a rectifying and refluxing zone and condensing the same, withdrawing acid containing impurities from said contact zone, removing portions of said impurities, reheating the acid, and reintroducing it into the contact zone.

3. The process of refining secondary alcohol produced from cracked petroleum products, which comprises passing vapors of a semi-refined constant boiling mixture of the alcohol and water in direct contact with dilute sulfuric acid in a contact zone, maintaining the concentration of acid in said zone substantially uniform, removing the vapors from said zone and condensing them, withdrawing contaminated acid liquor from said zone and stratifying the same to remove portions of the impurities therefrom, reheating the resulting acid and introducing it into the contact zone, and controlling the temperature of the acid in said zone so as to prevent decomposition of the alcohol vapors being purified.

4. The process of refining secondary alcohols produced from cracked petroleum products by the action of sulfuric acid, which comprises passing the alcohol to be purified in contact with and countercurrent to a flow of dilute sulfuric acid of 1.1–1.25 sp. gr. in a contact zone, removing the purified alcohol from said zone, withdrawing the acid solution containing impurities from said zone and diluting the same, thereafter reheating the dilute acid and introducing it into said contact zone.

5. The process of refining secondary alcohols, which comprises passing the alcohol to be refined in the vapor phase countercurrent and in contact with dilute sulfuric acid of 1.1–1.25 sp. gr. in a contact zone, removing the refined vapors from said zone and condensing them, maintaining a temperature in said zone above the condensing point of said vapors, and controlling the concentration of the acid introduced into said zone so as to prevent substantial decomposition of the alcohol being refined.

6. The process of refining alcohols to remove contained impurities therefrom, which comprises contacting the alcohol with dilute sulfuric acid of 1.1–1.25 sp. gr. in a contact zone wherein the alcohol passes in countercurrent flow to sulfuric acid passing therethrough, withdrawing sulfuric acid solution from said zone, partially purifying the same, restoring the resulting acid to approximately its original treating strength and reintroducing it into said zone, and maintaining the temperature in said zone below the decomposition point of the said alcohol.

7. The process of refining isopropyl alcohol to purify the same from tertiary alcohols, sulfur bodies and polymers, which comprises bringing the isoprpoyl alcohol to be purified into intimate contact with dilute sulfuric acid having a concentration such as not to cause substantial decomposition of the said alcohol, withdrawing spent acid solution from the contact zone, removing portions of the impurities therefrom, bringing the resulting acid to its original treating strength and reintroducing it into said contact zone.

8. The process of refining isopropyl alcohol to free the same of tertiary alcohols, which comprises passing the same in the vapor state countercurrent to and in contact with dilute sulfuric acid in a contact zone, condensing the purified alcohol vapors leaving said zone, maintaining a temperature in said zone above the boiling point of the isopropyl alcohol in the presence of water vapors, but below the decomposition point of the alcohol, and controlling the concentration of the acid introduced into said zone so as to prevent substantial decomposition of the said alcohol.

9. The process of refining isopropyl alcohol to remove therefrom tertiary alcohol and other impurities, which comprises intimately contacting the isopropyl alcohol to be purified in the vapor state with dilute sulfuric acid maintained in a contact zone, removing and condensing the vapors leaving said contact zone, and maintaining a temperature in said zone above the boiling point of the isopropyl alcohol mixed with water, and controlling said temperature to prevent substantial decomposition of said isopropyl alcohol.

10. The process of removing impurities from isopropyl alcohol, which comprises contacting in countercurrent, impure vapors of isopropyl alcohol with a dilute solution of sulfuric acid between the temperatures of 95–97° C. to extract from said vapors all impurities, collecting and withdrawing the acid containing the impurities, separating the impurities therefrom, heating and recirculating the purified acid into contact with the alcohol vapors, then collecting the vapors and condensing them.

11. The process of refining secondary alcohols to remove therefrom tertiary alcohols and other impurities, which comprises passing vapors of a constant boiling mixture of the secondary alcohol countercurrent to and in intimate contact with dilute sulfuric acid of 1.1 to 1.25 sp. gr. in a contact zone, conducting the vapors from said contact zone through a rectifying and reflux zone and returning the reflux to the contact zone, condensing the purified alcohol vapor leaving said reflux zone, maintaining temperatures in said contact and reflux zone uniformly within a narrow range above the boiling temperature of the constant boiling mixture treated, withdrawing spent acid from the contact zone, removing impurities therefrom, bringing the resulting acid to the original treating strength and temperature and reintroducing it into said contact zone.

SYLVAN R. MERLEY.